United States Patent [19]
Yamamoto et al.

[11] Patent Number: 5,627,812
[45] Date of Patent: May 6, 1997

[54] OPTICAL HEAD APPARATUS AND DIFFRACTION ELEMENT HAVING AT LEAST TWO DIFFRACTIVE SURFACES

[75] Inventors: Hiroaki Yamamoto; Seiji Nishino, both of Osaka, Japan

[73] Assignee: Matsushita Electric Industrial Co., Ltd., Japan

[21] Appl. No.: 337,369

[22] Filed: Nov. 8, 1994

[30] Foreign Application Priority Data

Nov. 8, 1993 [JP] Japan ................................. 5-278323

[51] Int. Cl.⁶ ................................................. G02B 6/12
[52] U.S. Cl. ................ 369/112; 369/44.23; 369/103; 369/109; 369/110; 359/485; 359/494
[58] Field of Search ................................. 369/112, 103, 369/44.23, 110, 109; 359/485, 494, 566; 65/30.1, 30.13

[56] References Cited

U.S. PATENT DOCUMENTS

| | | | |
|---|---|---|---|
| 4,458,980 | 7/1984 | Ohki et al. | 369/103 |
| 4,945,529 | 7/1990 | Ono et al. | 369/109 |
| 5,000,774 | 3/1991 | Varasi et al. | 65/30.1 |
| 5,062,098 | 10/1991 | Hori et al. | 369/112 |
| 5,168,489 | 12/1992 | Miyaguchi et al. | 369/112 |
| 5,212,572 | 5/1993 | Krantz et al. | 369/110 |
| 5,296,694 | 3/1994 | Kadowaki et al. | 369/112 |
| 5,353,267 | 10/1994 | Katayama | 369/109 |
| 5,367,403 | 11/1994 | Yamamoto et al. | 359/494 |
| 5,453,963 | 9/1995 | Katayama et al. | 369/112 |
| 5,455,712 | 10/1995 | Yamamoto et al. | 359/485 |
| 5,493,555 | 2/1996 | Kimura et al. | 369/112 |
| 5,495,461 | 2/1996 | Komma et al. | 369/103 |

FOREIGN PATENT DOCUMENTS 3-29137 2/1991 Japan.

*Primary Examiner*—Georgia Y. Epps
*Assistant Examiner*—Kim-Kwok Chu
*Attorney, Agent, or Firm*—Beveridge, DeGrandi, Weilacher & Young, L.L.P.

[57] ABSTRACT

The light reading the information of an optomagnetic disk is focused by a detector lens 104, and is put into a polarizing hologram 121 and a polarizing hologram 122 composed of lithium niobate. These polarizing holograms have action to separate a polarized light component in the z-axis direction and a polarized light component orthogonal thereto into transmitted light and diffracted light. The polarizing and separating hologram 121 is installed so that its z-axis may have an inclination of 45 degrees to the principal direction of polarization of incident light, and the z-axis of the polarizing and separating hologram 122 is set in a direction orthogonal thereto. Therefore the individual polarizing holograms transform different polarized light components into different wave planes. Accordingly, in a photo detector 196, TE signal and TM signal are obtained in different polarized light components, so that the imbalance of the head amplifiers can be eliminated.

11 Claims, 16 Drawing Sheets

Fig. 10

|  | Substrate | Proton exchange layer | Δn |
|---|---|---|---|
| Ordinary light | $n_o$ 2.287 | $n_{op}$ 2.247 | $\Delta n_o$ −0.04 |
| Extraordinary light | $n_e$ 2.203 | $n_{ep}$ 2.333 | $\Delta n_e$ 0.13 |

OPTICAL HEAD APPARATUS AND DIFFRACTION ELEMENT HAVING AT LEAST TWO DIFFRACTIVE SURFACES

BACKGROUND OF THE INVENTION

1. Field of the Invention

The present invention relates to an optical device used in an optical apparatus making use of polarization, and an optical head apparatus for reproducing the information signal of an optical recording medium.

2. Related Art of the Invention

The optical head apparatus used in an optical information processing apparatus for recording and reproducing information on an in optomagnetic disk medium is required to have a focus detecting function for forming a tiny spot on an optical disk, or a track detecting function for tracing a desired track accurately. The optical head apparatus is further demanded to have a function for detecting rotation in the direction of polarization by the optomagnetic recording disk medium.

A conventional optical head apparatus was disclosed, for example, in the Japanese Laid-Open Patent No. 3-29137. FIG. 16 is a structural diagram of a conventional optical head apparatus. Referring to this diagram, a conventional optical head apparatus is described below. The light emitted from a semiconductor laser 101 is transformed into parallel light by a collimating lens 102, and is condensed on an optical disk 105 by an objective lens 103 through a beam splitter 106 and a total reflection prism 110. The reflected light from the optical disk 105 is transformed again into parallel light by the objective lens 103, and is put into the beam splitter 106 through the total reflection prism 110, and is reflected by the beam splitter 106. The light reflected by the beam splitter 106 is transformed into a focusing light by a detector lens 104, and is put into a polarizing and separating hologram 120 made of lithium niobate. The z-axis of this crystal is disposed so as to have an inclination of 45 degrees to a principal direction of polarization of incident light. The polarizing and separating hologram 120 separates the polarized component in the z-axis direction of crystal and its orthogonal polarized light component into transmitted light and diffracted light. The negative primary diffracted light from the polarizing and separating hologram 120 is received by a photo detector 193, and positive primary light by a photo detector 194, and the transmitted light is received by a photo detector 192, and from the difference between the sum of the outputs of the photo detector 193 and photo detector 194, and the output of the photo detector 192, a recorded and reproduced signal can be obtained.

FIG. 17 is a diagram for showing the configuration of lattice pattern of polarizing and separating hologram 120 and segment division pattern of photo detector 194. In order to detect focus error and tracking error by using the positive primary diffracted light, the polarizing and separating hologram 120 is divided into four regions, and the photo detector 194 is divided into six segments. In a first lattice pattern area 181, while a light spot is formed correctly on the optical disk 105, the lattice is formed so that the incident light into this region may be focused at point A of the photo detector 194. Similarly, a second lattice pattern area 182, a third lattice pattern area 183, and a fourth lattice pattern area 184 form lattices so that the incident light of each region may be focused at point B, point C, and point D of the photo detector 194, respectively. A focus error signal is obtained from the differential signal of the sum of S1 and S4 and the sum of S2 and S3, and a tracking error signal is obtained from the differential signal of S5 and S6.

In the conventional optical head apparatus, the focus error signal and tracking error signal were detected by one polarization only. Therefore, six head amplifiers were needed to detect the signal. Furthermore, the optomagnetic signal for detecting by the operation of diffracted light and non-diffracted light caused deterioration because of the extreme imbalance of one head amplifier at the non-diffracted light side and five amplifiers at the diffracted light side.

Moreover, in the optical head of disk system or the like for employing the three-beam method for detection of tracking error signal and reading wobbling information of grooves by the push-pull method, the spot was complicated and it was hard to realize.

It is hence a primary object of the invention to present an optical head apparatus and optical device capable of decreasing the number of head amplifiers for detection of a signal, and eliminating imbalance of head amplifiers of optomagnetic signals.

SUMMARY OF THE INVENTION

To achieve the object, an optical head apparatus of a first invention comprises a radiation light source, a condenser optical system for receiving light beam of linear polarization from the radiation light source and converging into a tiny spot on information medium, and an optical system for reading out information from the light reflected and diffracted by the information medium, wherein the optical system for reading out the information comprises a first diffraction element for diffracting the polarized component in a specific direction, of the light reflected and diffracted by the information medium, and a second diffraction element for diffracting the polarized light in a direction orthogonal to the specific direction.

An optical head apparatus of a second invention comprises a radiation light source, a condenser optical system for receiving light beam of linear polarization from the radiation light source and converging into a tiny spot on information medium, and an optical system for reading out information from the light reflected and diffracted by the information medium, wherein the optical system for reading out the information comprises an optical system for giving aberration to the light reflected and diffracted by the information medium, a first diffraction element for diffracting a part of the polarized component in a specific direction, and a second diffraction element for diffracting a part of polarized light in a direction orthogonal to the specific direction.

An optical device of a third invention has a first proton exchange region on the surface of birefringence crystal, with the surface of the first proton exchange region being concave to the crystal surface, has a second proton exchange region on the back side of the birefringence crystal, and has a dielectric only on the top of the second proton exchange region.

An optical device of a fourth invention has a first proton exchange region on the surface of birefringence crystal, with the surface of the first proton exchange region being concave to the crystal surface, and has a second proton exchange region on the back side of the birefringence crystal, with the surface of the second proton exchange region being concave to the crystal surface.

An optical device of a fifth invention has a first proton exchange region on the surface of birefringence crystal, having a second proton exchange region on the back side of the birefringence crystal, and has a dielectric only on the top of the first proton exchange region and second proton exchange region.

An optical head apparatus of a sixth invention comprises a radiation light source, a condenser optical system for receiving light beam of linear polarization from the radiation light source and converging into a tiny spot on information medium, and an optical system for reading out information from the light reflected and diffracted by the information medium, wherein the optical system for reading out the information comprises a diffraction element for diffracting the polarized component in a specific direction of the light reflected and diffracted by the information medium into a first direction, and diffracting the polarized light in a direction orthogonal to the specific direction into a second direction.

An optical head apparatus of a seventh invention comprises a radiation light source, a condenser optical system for receiving light beam of linear polarization from the radiation light source and converging into a tiny spot on information medium, and an optical system for reading out information from the light reflected and diffracted by the information medium, wherein the optical system for reading out the information comprises an optical system for giving aberration to the light reflected and diffracted by the information medium, and a diffraction element for diffracting the polarized component in a specific direction into a first direction, and diffracting the polarized light in a direction orthogonal to the specific direction into a second direction.

According to the first invention, since focus signal and tracking signal are obtained by separate polarizations, the imbalance of the head amplifiers in detection of optomagnetic signal can be solved. According to the second invention, since the optomagnetic signal and each servo signal are detected separately, it is realized by one head amplifier for detection of optomagnetic signals.

According to the third to fifth inventions, the hologram device acting in different directions of polarization on the surface and back side of the substrate can be fabricated, and hologram devices different in action depending on the directions of polarization can be realized by one substrate. According to the sixth and seventh inventions, the optical head can be realized in a simple constitution.

BRIEF DESCRIPTION OF THE DRAWINGS

FIG. 10 is a diagram showing the refractive index of the substrate and refractive index of the proton exchange region.

Figure 1:
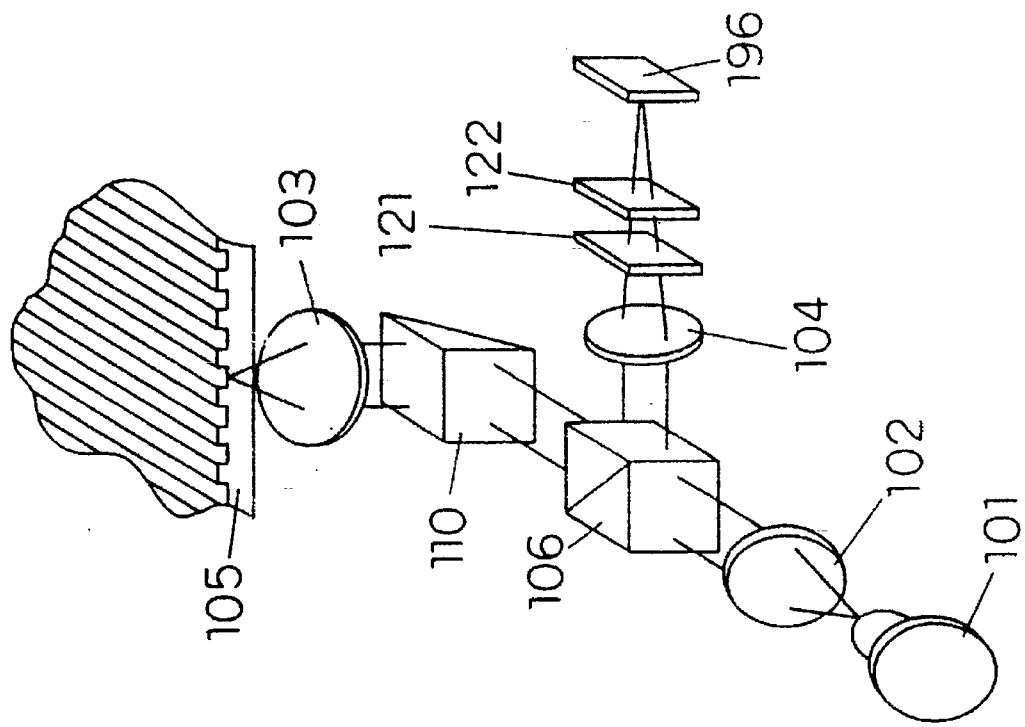
FIG. 1 is a structural diagram of the optical head apparatus of Embodiment 1.

| [Reference Numerals] | |
|---|---|
| 20 | Lithium niobate substrate |
| 21 | Proton exchange region |
| 102 | Collimating lens |
| 101 | Semiconductor laser |
| 103 | Objective lens |
| 104 | Detector lens |
| 105 | Optical disk |
| 106 | Beam splitter |
| 107 | Polarized beam splitter |
| 109 | Cylindrical lens |
| 110 | Total reflection prism |
| 111 | Diffraction lattice |
| 120 | Polarizing and separating hologram |
| 121 | Polarizing and separating hologram |
| 122 | Polarizing and separating hologram |
| 123 | Polarizing and separating hologram |
| 124 | Polarizing and separating hologram |
| 125 | Polarizing and separating hologram |
| 126 | Polarizing and separating hologram |
| 192 | Photo detector |
| 193 | Photo detector |
| 194 | Photo detector |
| 196 | Photo detector |
| 197 | Photo detector |

PREFERRED EMBODIMENTS (Embodiment 1)

FIG. 1 is a structural diagram of an optical head apparatus in a first embodiment. Referring to the diagram, the optical head apparatus in the first embodiment is described in detail below.

The light emitted from a semiconductor laser 101 is transformed into parallel light by a collimating lens 102, and is condensed on an optical disk 105 by an objective lens 103 by way of a beam splitter 106 and a total reflection prism 110. The reflected light from the optical disk 105 is transformed into parallel light again by the objective lens 103, and is put into the beam splitter 106 through the total reflection prism 110, and is reflected by the beam splitter 106. The light reflected by the beam splitter 106 is transformed into a focusing light by a detector lens 104, and is put into a first polarizing hologram 121 and a polarizing and separating hologram 122 made of lithium niobate.

The polarizing and separating hologram 121 and polarizing and separating hologram 122 have the action of separating the polarized light component in the z-axis direction of the crystal (i.e., in the z-axis direction of the crystal axis of the hologram) and its orthogonal polarized light component into transmitted light and diffracted light.

The polarizing and separating hologram 121 is installed so that its z-axis may have an inclination of 45 degrees to the principal direction of polarization of incident light, and the polarizing and separating hologram 122 is installed so that its z-axis may be orthogonal to the z-axis of the polarizing and separating hologram 121.

The light entering the polarizing and separating hologram 121 is polarized and separated into transmitted light and diffracted light, which are then put into the polarizing and separating hologram 122. The polarizing and separating hologram 122 has its crystal axis direction orthogonal to the polarizing and separating hologram 121, and therefore the transmitted light is diffracted in the polarizing and separating hologram 121, and the diffracted light is transmitted through the polarizing and separating hologram 122.

The light passing through the polarizing and separating hologram 121 and polarizing and separating hologram 122 enters a photo detector 196, and a recorded and reproduced signal and a servo signal are obtained.

Figure 2:
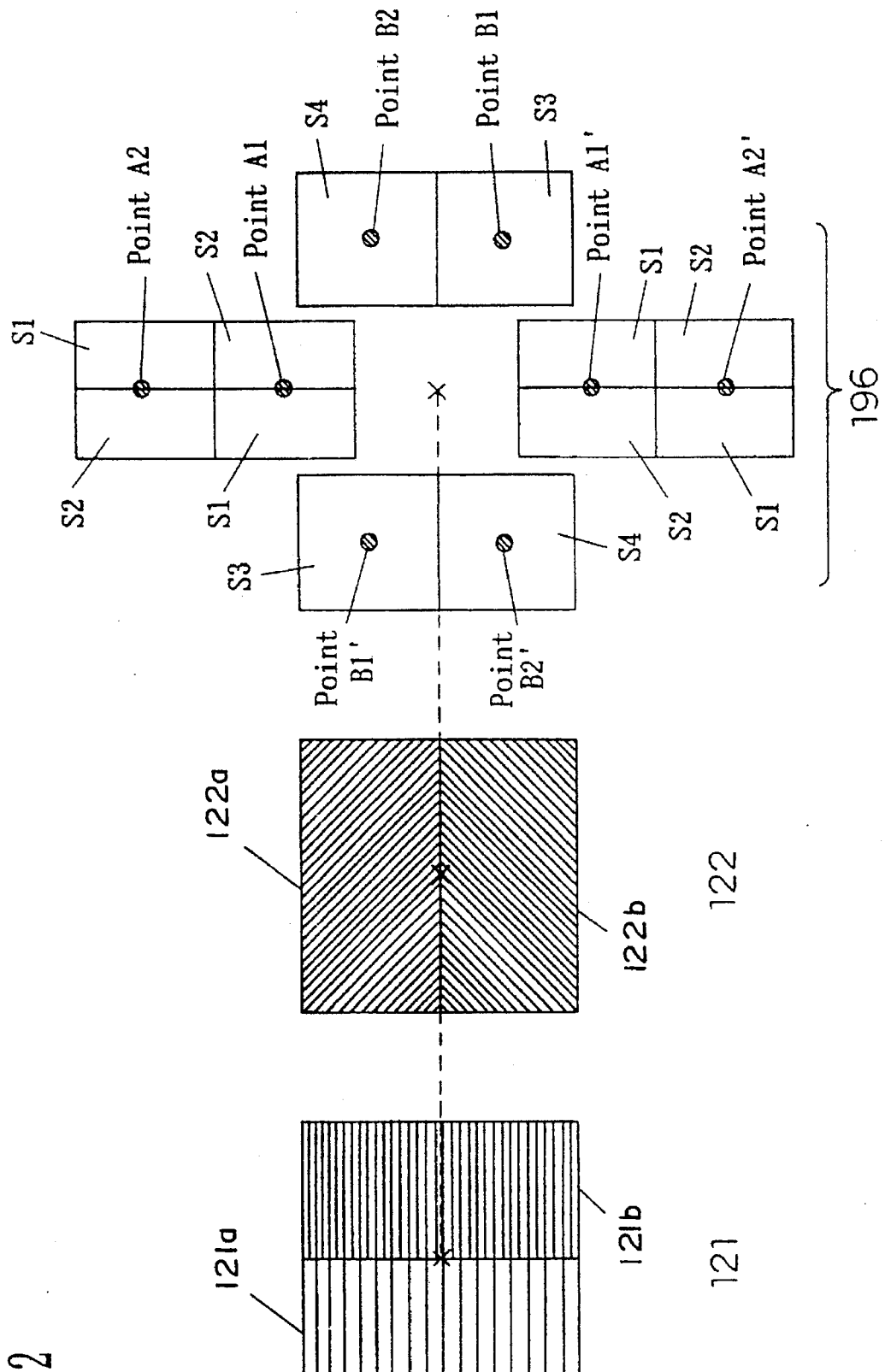
FIG. 2 is a diagram showing the configuration of the lattice pattern of a polarizing and separating hologram and the segment division pattern of a photo detector in the optical head apparatus of Embodiment 1.

FIG. 2 is a diagram showing the configuration of the lattice pattern of the polarizing and separating hologram 121 and polarizing and separating hologram 122 and the segment division pattern of the photo detector 196 in the first embodiment. In the polarizing and separating hologram 121, while a light spot is correctly formed on the optical disk 105, the lattices are formed so that the light diffracted in the first lattice pattern area of the polarizing and separating hologram 121 may be focused on point A1, point A1', and the light diffracted in the second lattice pattern area, on point A2, point A2'.

At this time, the lattices are also formed so that the light diffracted in the first lattice pattern area of the polarizing and separating hologram 122 may be focused on point B1, point B1', and the light diffracted in the second lattice pattern area, on point B2, point B2'.

The optomagnetic signal is detected by the difference between the diffracted light of the polarizing and separating hologram 121 and the diffracted light of the polarizing and separating hologram 122, that is, (S1+S2)−(S3+S4).

A focus error signal is detected, according to the knife edge method, by the difference (S1−S2) of light diffracted by the first lattice pattern area and the second lattice pattern area of the polarizing and separating hologram 121. In this constitution, deterioration of focus error by groove crossing signal is prevented by optically matching the region division line of the polarizing and separating hologram 121 with the radial direction of the disk. Incidentally, the deviation of diffraction position due to wavelength fluctuations of the semiconductor laser 101 will not affect the focus signal because the diffraction direction coincides with the division line direction.

A tracking error signal is detected, according to the push-pull method, by S3−S4 of the light diffracted by the first lattice pattern area and second lattice pattern area of the polarizing and separating hologram 122. In this constitution, since the light is divided by the polarizing and separating hologram 122, deviation of diffraction position due to wavelength fluctuations of the semiconductor laser 101 will not affect the tracking signal.

In this constitution, detection of various signals can be realized by four head amplifiers, and the number of head amplifiers responsible for detection of optomagnetic signals is 2:2 and a well-balanced detection is enabled.

Herein, as the polarizing and separating hologram 121 and polarizing and separating hologram 122, the example was an orthogonal use of two polarization anisotropic holograms for passing the polarized light in the z-axis direction and diffracting the polarized light vertical to the z-axis direction, but this is not limitative as far as two polarization anisotropic holograms differing in the polarization direction for diffraction. The same effects are obtained, for example, by a method of orthogonal use of two polarization anisotropic holograms for diffracting the polarized light in the z-axis direction, or a combination of a polarization anisotropic hologram for diffracting the polarized light in the z-axis direction and a polarization anisotropic hologram for diffracting the polarized light vertical to the z-axis direction. Not limited to the polarization anisotropic hologram made of lithium niobate, for example, polarization anisotropic holograms and high density diffraction elements made of lithium tantalate and other birefringent materials may be also employed.

(Embodiment 2)

This embodiment relates to an optical head for detecting a wobbling signal of a groove by the push-pull method, using the three-beam method as a tracking servo, and is used, for example, in a mini disk or the like. As the optical constitution, a diffraction lattice 111 is disposed in the optical path of the semiconductor laser 101 and beam splitter 106 of the constitution shown in FIG. 1.

Figure 3:
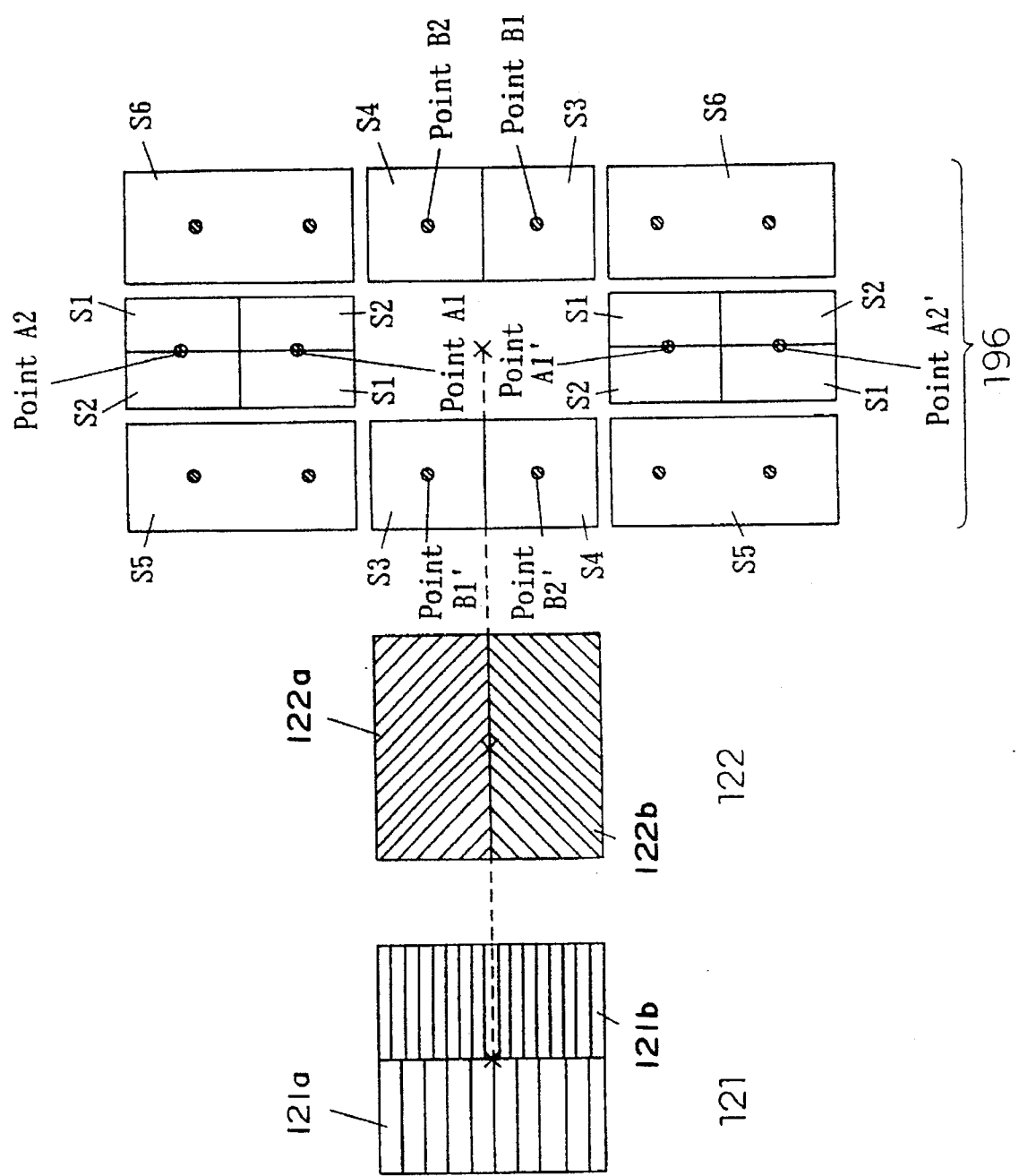
FIG. 3 is a diagram showing the configuration of the lattice pattern of a polarizing and separating hologram and the segment division pattern of a photo detector in the optical head apparatus of Embodiment 2.

FIG. 3 shows the configuration of the lattice pattern of the polarizing and separating hologram 121 and polarizing and separating hologram 122 and the segment division pattern of the photo detector 196 of this embodiment. Detection of the focus servo signal, the push-pull signal, and the optomagnetic signal is same as in the first embodiment. In this embodiment, the tracking signal is detected by the three-beam method.

The light separated into a main beam and two sub-beams by the diffraction lattice 111 is reflected by the optical disk 105, and is finally put into the photo detector 196. The optical head is adjusted so that the two sub-beams may be slightly off the track in reverse direction when the main beam is on the track. Accordingly, when the main beam goes off the track, the light intensity is imbalanced between the sub-beams, and hence a tracking signal is detected.

According to this constitution, the sub-beams, like the main beam, are diffracted and separated by the polarizing and separating hologram 121 and polarizing and separating hologram 122, but are entered in positions of S5 and S6, as shown in the diagram, in order to keep configuration with the main beam. Thus, by the difference of S5 and S6 (S5−S6), a tracking signal is obtained. In this constitution, sub-beams corresponding to the main beam produced by the diffraction by the polarizing and separating hologram 122 are also generated, but are omitted in the diagram for the sake of simplicity. In this embodiment, although these sub-beams are not used in detection of a tracking signal, but they can be detected by forming a detection segment in the region in which they enter.

Thus, the invention easily realizes an optical head apparatus for detecting wobbling signals of grooves by the push-pull method by employing the three-beam method as tracking servo.

(Embodiment 3)

This embodiment relates to an optical head apparatus differing in the division method of the photo detector 196 by using the same optical system as in the first embodiment, and is characterized by an ample tolerance for position deviation of the photo detector 196.

Figure 4:
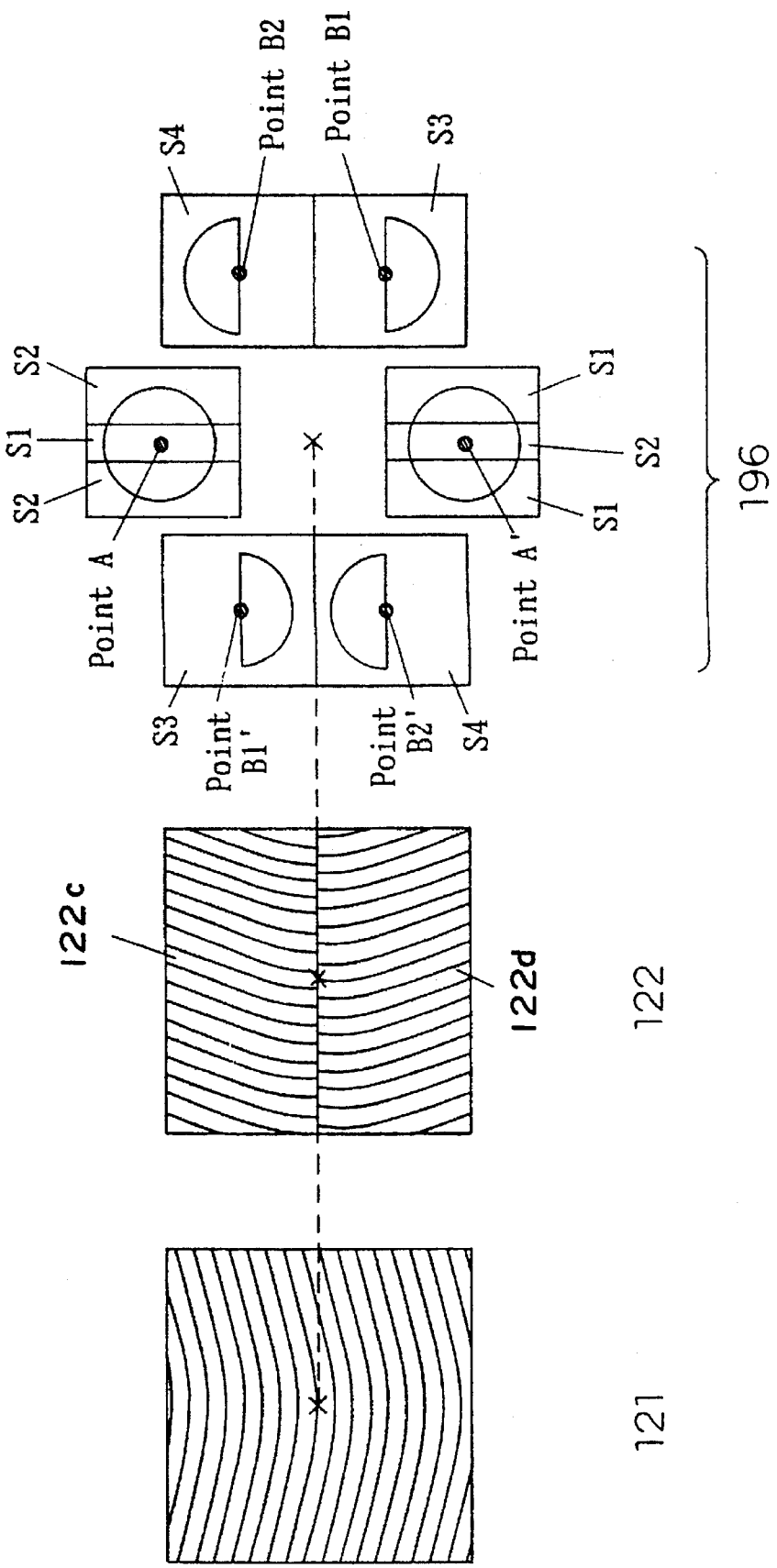
FIG. 4 is a diagram showing the configuration of the lattice pattern of a polarizing and separating hologram and the segment division pattern of a photo detector in the optical head apparatus of Embodiment 3.

FIG. 4 is a diagram showing the configuration of the lattice pattern of the polarizing and separating hologram 121 and polarizing and separating hologram 122 and the segment division pattern of the photo detector 196 in the first embodiment. The polarizing and separating hologram 121 forms lattices having a lens action for focusing the light diffracted by the polarizing and separating hologram 121 behind point A1 and ahead of point A1' when the light spot is correctly formed on the optical disk 105.

The polarizing and separating hologram 122 forms lattices so that the light diffracted in the first lattice pattern area may enter point B1, point B1', and the light diffracted in the second lattice pattern area, point B2, point B2'. The lattices have the same lens action as in the polarizing and separating hologram 121, thereby preventing imbalance of optomagnetic signal due to difference in the condensing state on the photo detector 196.

The optomagnetic signal is detected by the difference between the diffracted light of the polarizing and separating hologram 121 and the diffracted light of the polarizing and separating hologram 122, that is, (S1+S2)−(S3+S4).

A focus error signal is detected by S1−S2, by the spot size method. In this constitution, deterioration of focus error by groove crossing signal is prevented by optically matching the region division line of the polarizing and separating hologram 121 with the radial direction of the disk. Incidentally, the deviation of diffraction position due to wavelength fluctuations of the semiconductor laser 101 will not affect the focus signal because the diffraction direction coincides with the division line direction.

A tracking error signal is detected, according to the push-pull method, by S3−S4 of the light diffracted by the first lattice pattern area and second lattice pattern area of the polarizing and separating hologram 122. In this constitution, since the light is divided by the polarizing and separating hologram 122, deviation of diffraction position due to wavelength fluctuations of the semiconductor laser 101 will not affect the tracking signal.

According to this constitution, deterioration of the focus signal due to position deviation of the photo detector 196 in the lateral direction of the drawing is sufficiently smaller than in the first embodiment. The deviation in the vertical direction of the drawing may have an arbitrary allowance by keeping a sufficient width in the longitudinal direction of each segment.

(Embodiment 4)

This embodiment relates to an optical head apparatus for detecting a wobbling signal of a groove by the push-pull method, using the three-beam method as a tracking servo, same as in the second embodiment, having the features of the third embodiment.

In the optical constitution, same as in the second embodiment, the diffraction lattice 111 is disposed in the optical path of the semiconductor laser 101 and beam splitter 106.

Figure 5:
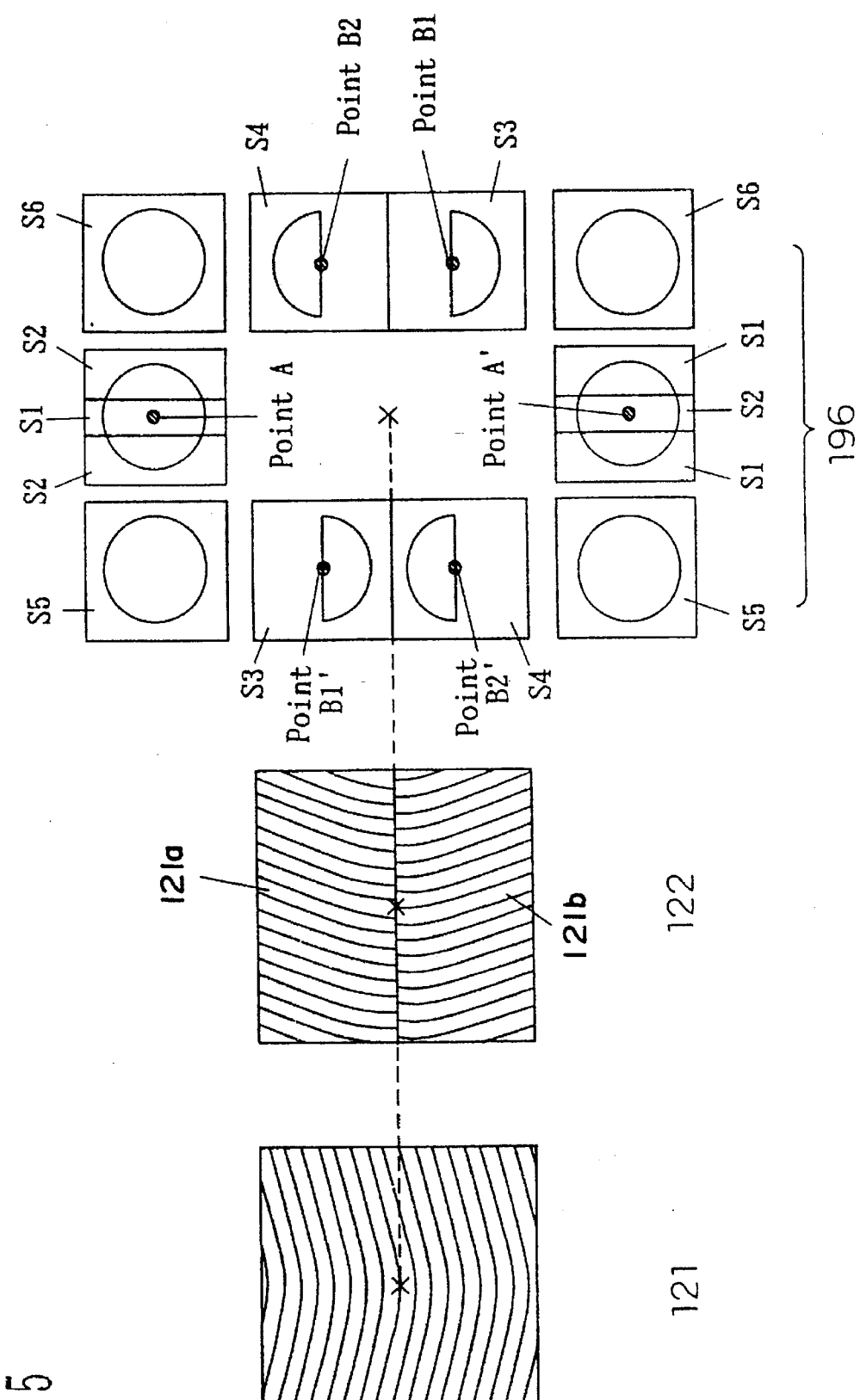
FIG. 5 is a diagram showing the configuration of the lattice pattern of a polarizing and separating hologram and the segment division pattern of a photo detector in the optical head apparatus of Embodiment 4.

FIG. 5 shows the configuration of the lattice pattern of polarizing and separating hologram 121 and polarizing and separating hologram 122 and segment division pattern of the photo detector 196. Detection of the focus servo signal, the push-pull signal and the optomagnetic signal is the same as in the second embodiment. The tracking signal is detected by S5−S6 by the three-beam method.

(Embodiment 5)

This embodiment relates to an optical head of low cost, decreasing the number of head amplifiers for detection of an optomagnetic signal by separating the segment for detecting the optomagnetic signal and the segment for detecting the tracking signal and focus servo signal.

Figure 6:
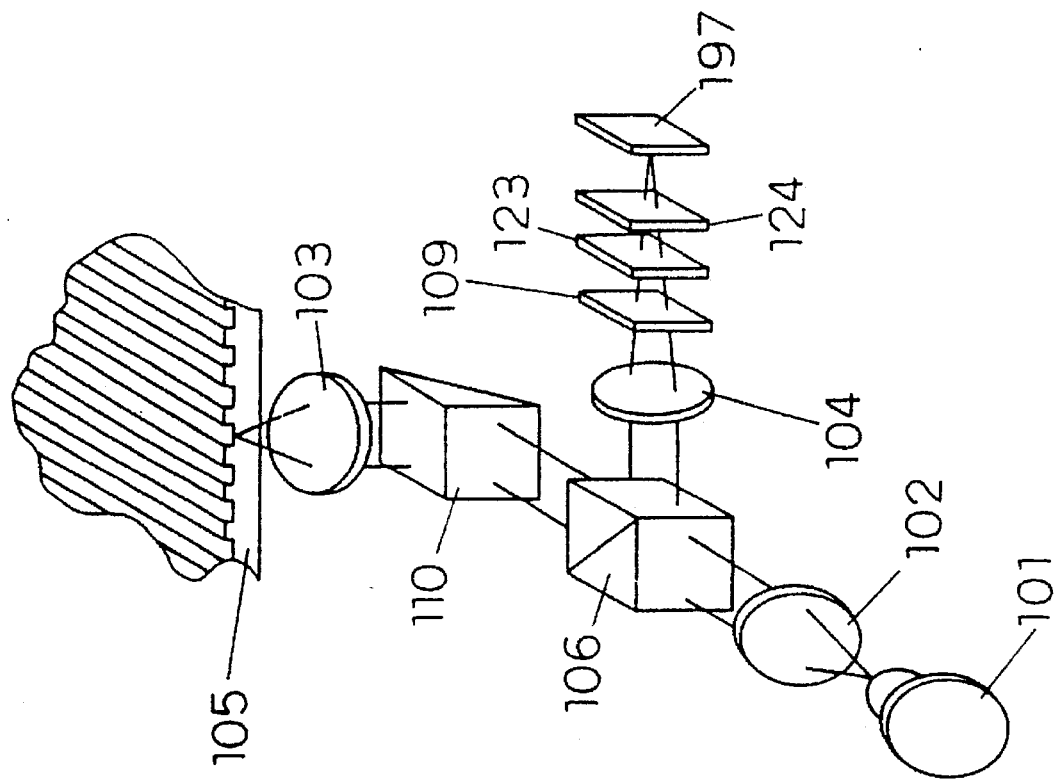
FIG. 6 is a structural diagram of the optical head apparatus of Embodiment 5.

FIG. 6 is a structural diagram of an optical head apparatus of the embodiment. Referring to the diagram, the optical head apparatus of the embodiment is described below.

The light emitted from the semiconductor laser 101 is transformed into parallel light by the collimating lens 102, and is condensed on the optical disk 105 by the objective lens 103 by way of the beam splitter 106 and total reflection prism 110. The reflected light from the optical disk 105 is transformed again into parallel light by the objective lens 103, and is put into the beam splitter 106 through the total reflection prism 110, and is reflected by the beam splitter 106. The light reflected by the beam splitter 106 is transformed into focusing light by the detector lens 104. This light further passes through a cylindrical lens and is provided with astigmatism, and enters a first polarizing hologram 123 and polarizing and separating hologram 124.

The polarizing and separating hologram 123 and polarizing and separating hologram 124 have the action of not diffracting the polarized light component in the z-axis direction of the crystal, but separating its orthogonal polarized light component into transmitted light and diffracted light at a specific rate.

The polarizing and separating hologram 123 is installed so that its z-axis has an inclination of 45 degrees to the principal direction of polarization of incident light, and the polarizing and separating hologram 124 is installed so that its z-axis may be orthogonal thereto.

Figure 7:
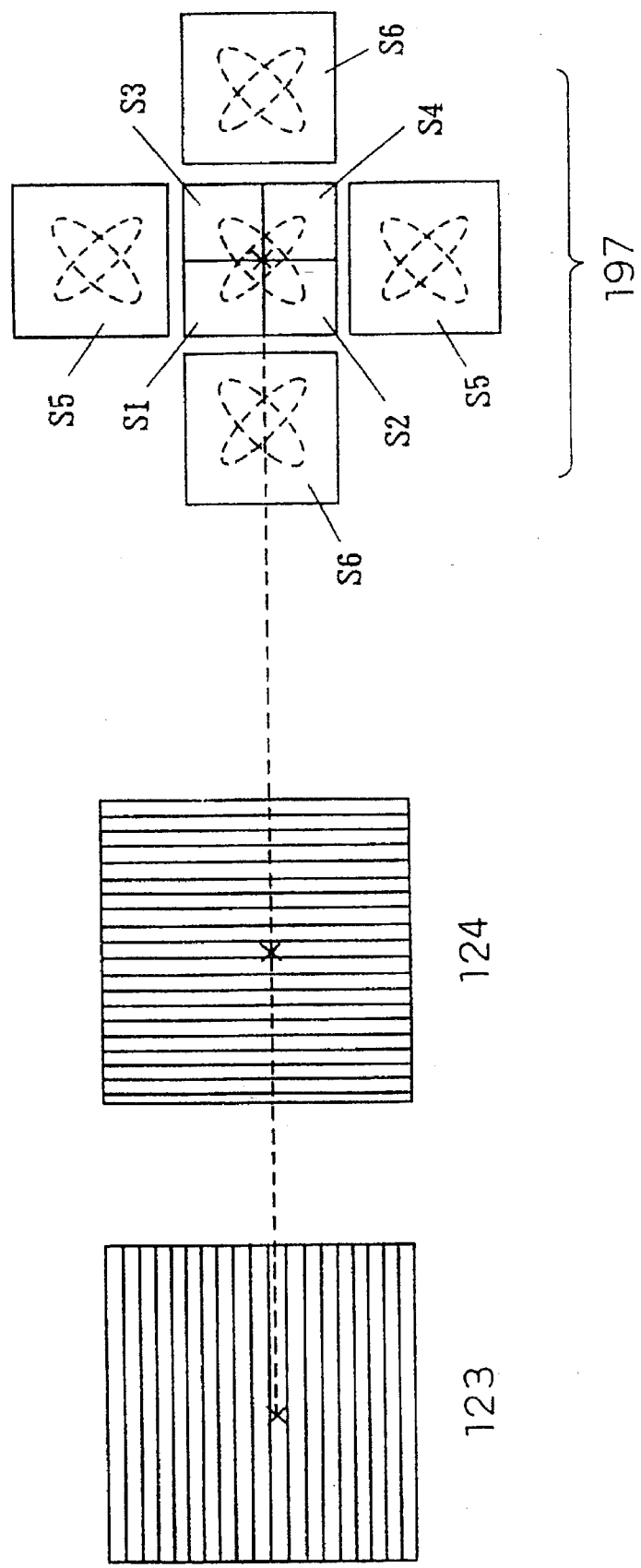
FIG. 7 is a diagram showing the configuration of the lattice pattern of a polarizing and separating hologram and the segment division pattern of a photo detector in the optical head apparatus of Embodiment 5.

The configuration of the lattice pattern of the polarizing and separating hologram 123 and polarizing and separating hologram 124 and the segment division pattern of a photo detector 197 in the fifth embodiment is shown in FIG. 7, and its operation is described below.

The light entering the polarizing and separating hologram 123 is polarized and separated into transmitted light and diffracted light. At this time, the diffracted light has only a component orthogonal to the z-axis of the polarizing and separating hologram 123, but the transmitted light has both the z-axis direction component and orthogonal component.

The light passing through the polarizing and separating hologram 123 further enters the polarizing and separating hologram 124, but since the diffracted light of the polarizing and separating hologram 123 has only a component orthogonal to the z-axis of the polarizing and separating hologram 123, it is not diffracted by the polarizing and separating hologram 124 and passes through, and enters s5 of the photo detector 197. On the other hand, of the light passing through the polarizing and separating hologram 123, the polarized light in the vertical direction to the z-axis of the polarizing and separating hologram 124 is partly diffracted and enters s6, and the rest passes through and enters the central part of a photo detector 193. Incidentally, of the light passing through the polarizing and separating hologram 123, the polarized light in the z-axis direction of the polarizing and separating hologram 124 is not diffracted by the polarizing and separating hologram 124, but is put into the central part of the photo detector 193.

The optomagnetic signal is detected by the difference between the diffracted light of the polarizing and separating hologram 123 and the diffracted light of the polarizing and separating hologram 124, that is, S5−S6.

A focus error signal is detected by (s1+s4)−(s2+s3) by the astigmatism method, according to the astigmatism caused by the cylindrical lens 109.

A tracking signal is detected by (s1+s2)−(s3+s4), by the push-pull method.

In this constitution, the optomagnetic signal can be detected by two head amplifiers.

Herein, as the polarizing and separating hologram 123 and polarizing and separating hologram 124, the example was an orthogonal use of two polarization anisotropic holograms for passing all polarized light in the z-axis direction, but this is not limiting as far as two polarization anisotropic holograms differing in the polarization direction for diffraction. The same effects are obtained, for example, by a method of orthogonal use of two polarization anisotropic holograms for passing all polarized light orthogonal to the z-axis direction, or a combination of a polarization anisotropic hologram for passing all polarized light in the z-axis direction and a polarization anisotropic hologram for passing all polarized light vertical to the z-axis direction. Not limited to the polarization anisotropic hologram made of lithium niobate, for example, polarization anisotropic holograms and high density diffraction elements made of lithium tantalate and other birefringent materials may be also employed.

(Embodiment 6)

The embodiment relates to an optical head apparatus for detecting a wobbling signal of a groove by the push-pull method, using the three-beam method as a tracking servo the same as in the second embodiment, having the same features as in the fifth embodiment.

In the optical constitution, the diffraction lattice 111 is disposed in the optical path of the semiconductor laser 101 and beam splitter 106 in the constitution shown in FIG. 6 same as in the fifth embodiment.

Figure 8:
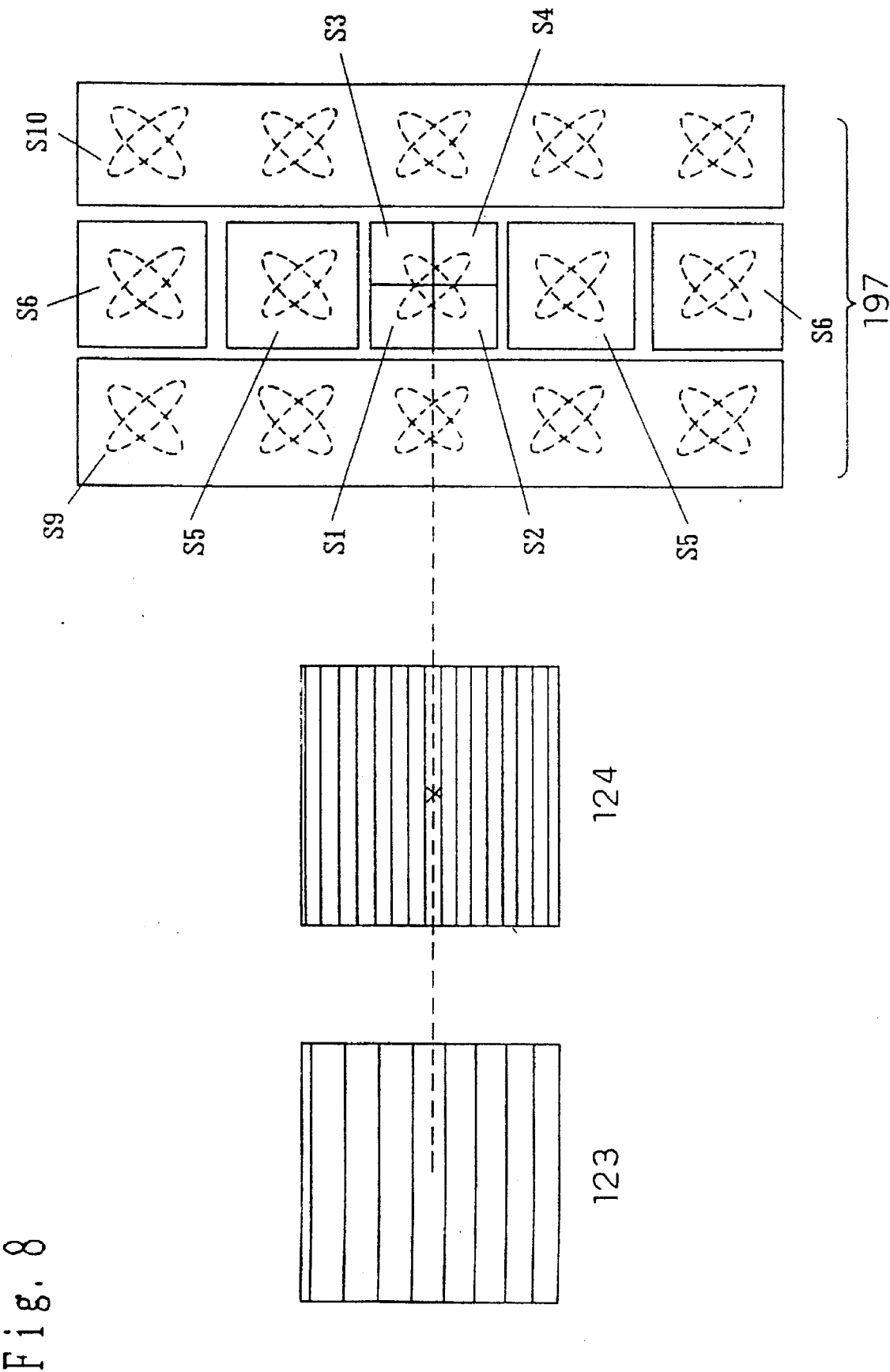
FIG. 8 is a diagram showing the configuration of the lattice pattern of a polarizing and separating hologram and the segment division pattern of a photo detector in the optical head apparatus of Embodiment 6.

FIG. 8 shows the configuration of the lattice pattern of the polarizing and separating hologram 123 and polarizing and separating hologram 124 and the segment division pattern of the photo detector 197 of the embodiment. Detection of the focus servo signal, the push-pull signal, and the optomagnetic signal is same as in the fifth embodiment. The tracking signal is detected by S9–S10 by the three-beam method.

(Embodiment 7)

This embodiment relates to a polarization anisotropic hologram for diffracting two orthogonal polarized light components in different positions. By using this polarization anisotropic hologram, the optical head apparatus in the first to sixth embodiments can be constituted by one polarization anisotropic hologram.

Figure 9A:
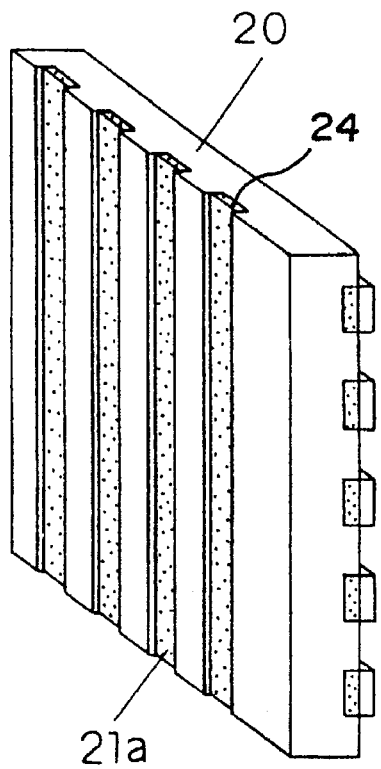
FIG. 9(a) and 9(b) are perspective views of the optical device of Embodiment 7.
Figure 9B:
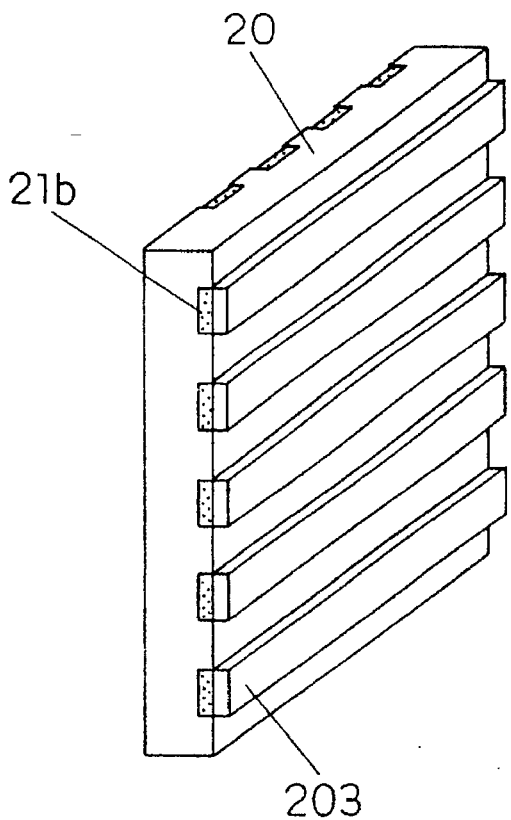

FIG. 9(a) and 9(b) are perspective view of the polarization anisotropic hologram of the embodiment. A perspective view from the surface side is given in 9(a), and from the back side in 9(b). Reference numeral 20 is a lithium niobate substrate of an x-plane, and 21a is a proton exchange region formed periodically on the surface of the lithium niobate substrate 20, and on the surface of the lithium niobate substrate 20, moreover, only the region of the proton exchange region 21 is etched to form a groove 24. On the back side of the lithium niobate substrate 20, similarly, a periodic proton exchange region 21b is formed. Reference numeral 203 is a dielectric film, which is formed in the same pattern only in the proton exchange region 21b.

Hereinafter, the polarization anisotropic hologram of the embodiment is described. The function of this polarization anisotropic hologram can be considered by dividing the function into the surface side and the back side. The surface diffracts ordinary light (light having a field vector in the y-axis direction of the crystal) and does not diffract extraordinary light (light having a field vector in the z-axis direction of the crystal), while the back side diffracts extraordinary light and does not diffract ordinary light, thus having reverse functions. They correspond to the first polarization anisotropic hologram and second polarization anisotropic hologram shown in the first to sixth embodiments.

First the function of the surface side is explained. The function of the surface side to diffract the ordinary light, not diffracting extraordinary light.

FIG. 10 shows the refractive index of the substrate and the refractive index of the proton exchange region. The refractive index varies somewhat depending on the fabrication condition of the substrate and the proton exchange condition, but representative values are shown. In the diagram, $n_o$ denotes the refractive index of ordinary light of the lithium niobate substrate 20, $n_e$ is the refractive index of extraordinary light of the lithium niobate substrate 20, $n_{op}$ is the refractive index of ordinary light of the proton exchange region 21, and $n_{ep}$ is the refractive index of extraordinary light of the proton exchange region 21. Meanwhile, $\Delta n_o$, $\Delta n_e$ are differences of ordinary light and extraordinary light of the proton exchange region 21 and the lithium niobate substrate 20, which are expressed as follows.

$$\Delta n_o = n_{op} - n_o \qquad \text{(Formula 1)}$$

$$\Delta n_e = n_{ep} - n_e \qquad \text{(Formula 2)}$$

The refractive index of the proton exchange region 21 is, as compared with the refractive index of lithium niobate substrate 20, increased in the refractive index $n_e$ of extraordinary light by 0.13, and decreased in the refractive index $n_o$ of ordinary light by 0.04 to the contrary.

The polarization anisotropic hologram makes use of this difference in change of refractive index.

First suppose an ordinary light enters the polarizing and separating element. On the basis of the phase of the light not passing through the proton exchange region 21a, that is, passing only through the lithium niobate substrate 20, the refractive index of the proton exchange region 21a and groove 24 is smaller than that of the lithium niobate substrate 20, and therefore the light passing through this region is advanced in phase. The phase changing amount $\Delta \phi o$ is expressed as follows, assuming the phase advancing to be negative and delaying to be positive.

$$\Delta \phi o = (2\pi/\lambda)(\Delta n_o \cdot dp + \Delta n_o a \cdot da) \qquad \text{(Formula 3)}$$

where $\lambda$ is the wavelength of incident light, and $n_o a$ is the difference between the ordinary light refractive index $n_o$ of the substrate and the refractive index 1 of air, and is given as follows.

$$\Delta n_o a = 1 - n_o \qquad \text{(Formula 4)}$$

On the other hand, supposing entry of extraordinary light into the polarizing and separating element, the phase of light is considered on the basis of the light passing only through the lithium niobate substrate 20, not passing through the proton exchange region 21. Since the refractive index of the groove 24 is smaller than the refractive index of the lithium niobate substrate 20, the light passing through this region is advanced in phase. By contract, the refractive index of the proton exchange region 21 is larger than the refractive index of the lithium niobate substrate 20, the light passing through this region is delayed in phase, acting in a direction to cancel the advance of the phase by the groove 24. The phase changing amount $\Delta \phi e$ is expressed as follows, assuming the phase advancing to be negative and delaying to be positive.

$$\Delta \phi e = (2\pi/\lambda)(\Delta n_e \cdot dp + \Delta n_e a \cdot da) \qquad \text{(Formula 5)}$$

where $\lambda$ is the wavelength of incident light, da is the depth of groove, and $\Delta n_e a$ is the difference between the extraordinary light refractive index $n_e$ of the substrate and the refractive index 1 of air, which is given as follows.

$$\Delta n_e a = 1 - n_e \quad \text{(Formula 6)}$$

The function of the surface side is to diffract the ordinary light, and not to diffract extraordinary light. Therefore, the condition for not diffracting the extraordinary light is to satisfy the formula:

$$(2\pi/\lambda)(\Delta n_e \cdot dp + \Delta n_e a \cdot da) = 2 m\pi \quad \text{(Formula 8)}$$

where m is an arbitrary integer.

In order to diffract ordinary light, $\Delta\phi o$ should have a proper value. Hence this function is realized by properly selecting the proton exchange depth dp and groove depth da in order to satisfy the above condition.

The function of the back side is described below. The function of the back side is to diffract extraordinary light, not diffracting ordinary light, contrary to the function of the surface side. As mentioned above, the refractive index of the proton exchange region is increased by 0.13 in extraordinary light relative to the substrate, and decreased by 0.04 in ordinary light. On the basis of the phase of the light passing only through the lithium niobate substrate 20, not passing through the proton exchange region 21b, the phase difference of polarized light passing through the dielectric film 203 and proton exchange region 21b is as follows.

$$\Delta\phi o = (2\pi/\lambda)(\Delta n_o \cdot dp + \Delta nda \cdot dd) \quad \text{(Formula 9)}$$

$$\Delta\phi e = (2\pi/\lambda)(\Delta ne \cdot dp + \Delta nea \cdot dd) \quad \text{(Formula 10)}$$

where dd is the thickness of the dielectric film 203, and $\Delta$nda is the difference between the refractive index nd of the dielectric film 203 and the refractive index 1 of air, which is expressed as follows:

$$\Delta nda = nd - 1 \quad \text{(Formula 11)}$$

The condition for not diffracting ordinary light is that $\Delta\phi o$ is 0 or an integer multiple of ($2\pi$). For diffraction of extraordinary light, $\Delta\phi e$ may have a proper value, and dd and dp should be selected to satisfy these two conditions.

Figure 11A:
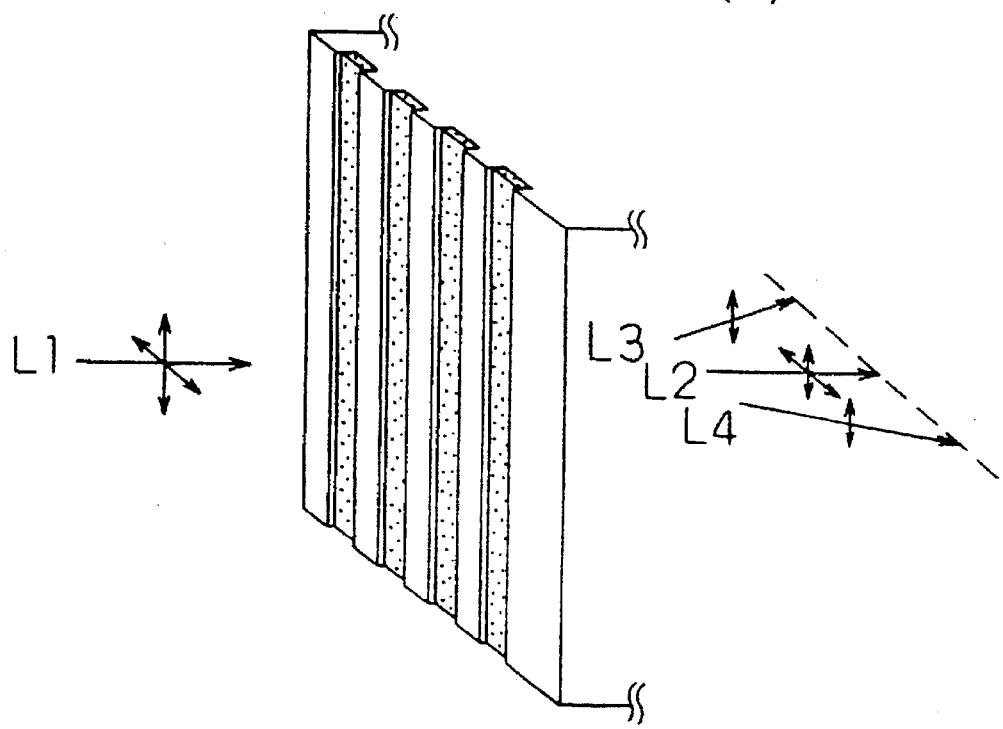
FIG. 11(a) and 11(b) are diagrams for explaining the operation of the optical device of Embodiment 7.

In this way, a hologram having different polarization characteristics on the surface side and back side can be realized on one substrate. These compound functions of the element are described below while referring to FIG. 11(a) and 11(b). First suppose a mixed light L1 of ordinary light and extraordinary light enters the element surface (FIG. 11(a)). By the action of the surface, only the ordinary light component of L1 is partly diffracted (L3, L4), and the extraordinary light components and the rest of the ordinary light component pass through directly (L2).

Figure 11B:
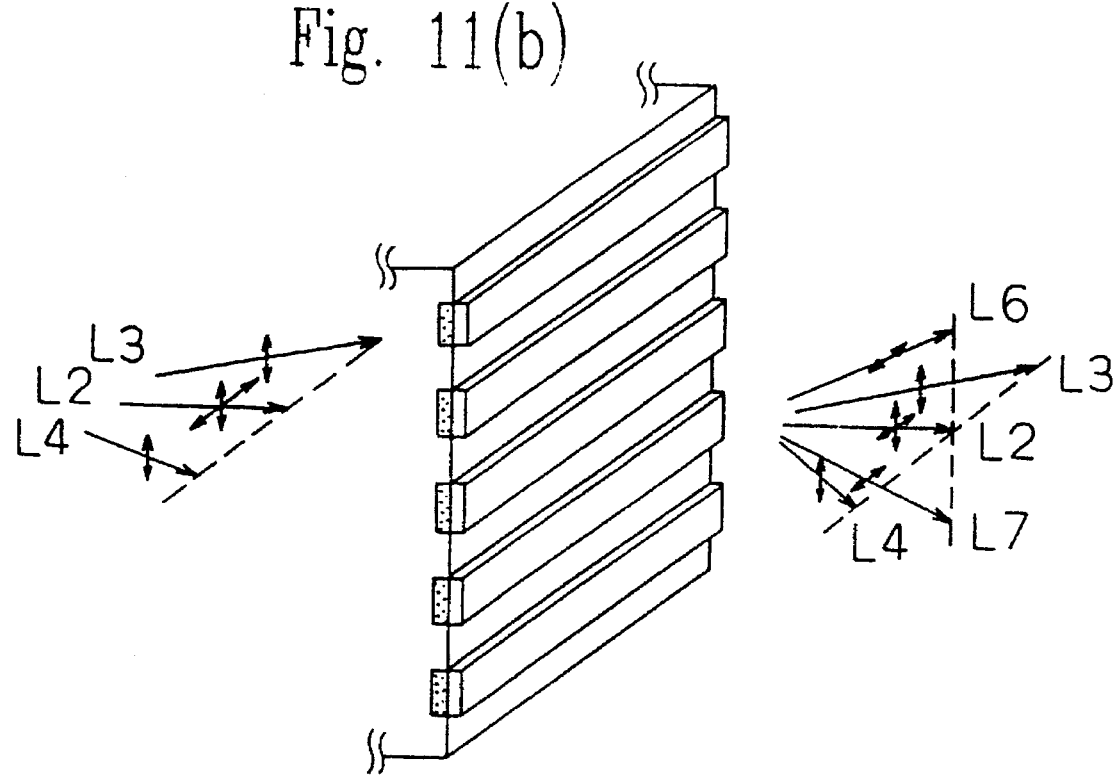

Consequently, these lights enter the back side (FIG. 11(b)). Since L3 and L4 contain only ordinary light components, they directly pass through the back side. On the other hand, L2 involves extraordinary light component, and part of this polarized light component is diffracted (L6, L7). Moreover, part of the extraordinary component of L2 and ordinary light component pass through directly (L5).

Thus, this element can act as the polarization anisotropic hologram for diffracting two orthogonal polarized light components into different positions. In this embodiment, a part of the incident light directly passes through the element, but this is not limiting, and all polarized light components to be diffracted on the surface side and back side can be diffracted, and it can be applied to the optical head apparatus in the first to sixth embodiments, and the functions of two polarization anisotropic holograms can be realized by one polarized light anisotropic hologram.

Herein, lithium niobate is used as the substrate, but it is not limiting, and it can be realized by, for example, lithium tantalate, mixed crystal of lithium tantalate and lithium niobate, and other birefringent materials.

(Embodiment 8)

Figure 12A:
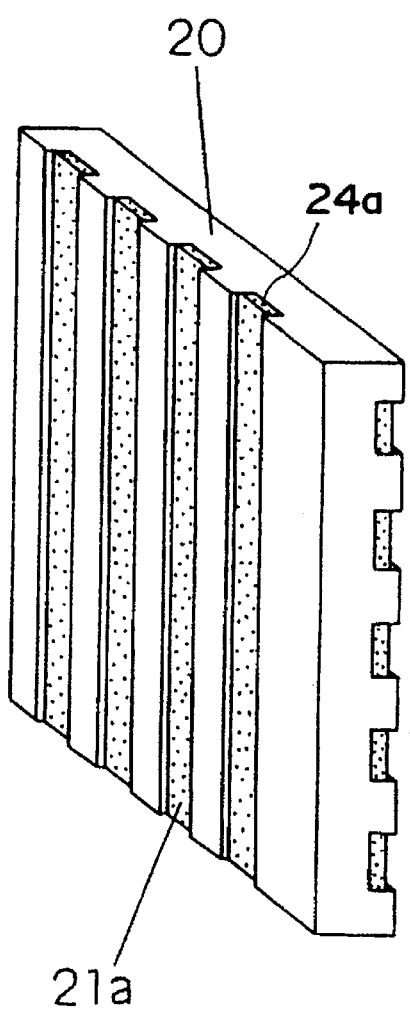
FIG. 12(a) and 12(b) are perspective view of optical device of the Embodiment 8.
Figure 12B:
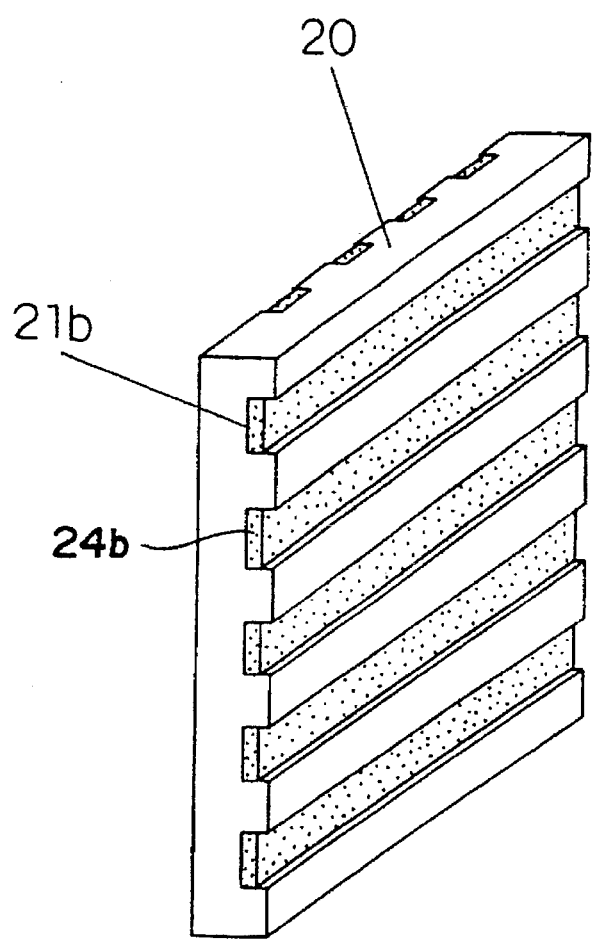

This embodiment is intended to realize the device having the same function as in Embodiment 7 by a different constitution. FIG. 12(a) and 12(b) is a perspective view of the polarization anisotropic hologram of the embodiment, showing a view from the surface side in 12(a) and from the back side in 12(b). Reference numeral 20 is a lithium niobate substrate of an x-plane, and 21a is a proton exchange region formed periodically on the surface of the lithium niobate substrate 20, and on the surface of the lithium niobate substrate 20, moreover, only the region of the proton exchange region 21 is etched to form a groove 24a. On the back side of the lithium niobate substrate 20, similarly, a periodic proton exchange region 21b and a groove 24b are formed.

The surface of this device operates the same as the device in Embodiment 7. The back side diffracts only extraordinary light same as the back side in Embodiment 7, but its principle of operation is different. In this device, in order not to diffract the ordinary light, $\Delta\phi o$ expressed in formula (3) is set at an integer multiple of ($2\pi$) (for example, $2\pi$), and $\Delta\phi e$ is determined so as to obtain a desired diffraction efficiency of extraordinary light by defining the depth of the proton exchange region 21b and groove 24b.

Thus, the device having the same function as in Embodiment 7 can be realized in a different structure.

(Embodiment 9)

Figure 13A:
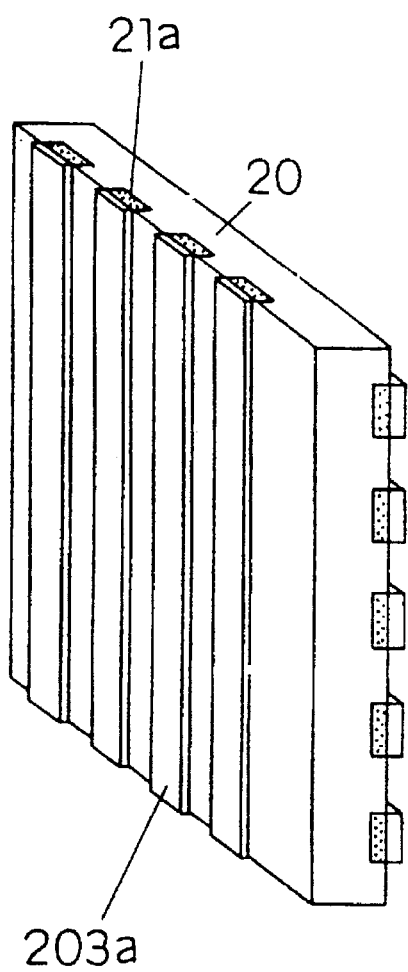
FIG. 13(a) and 13(b) are perspective views of the optical device of Embodiment 9.
Figure 13B:
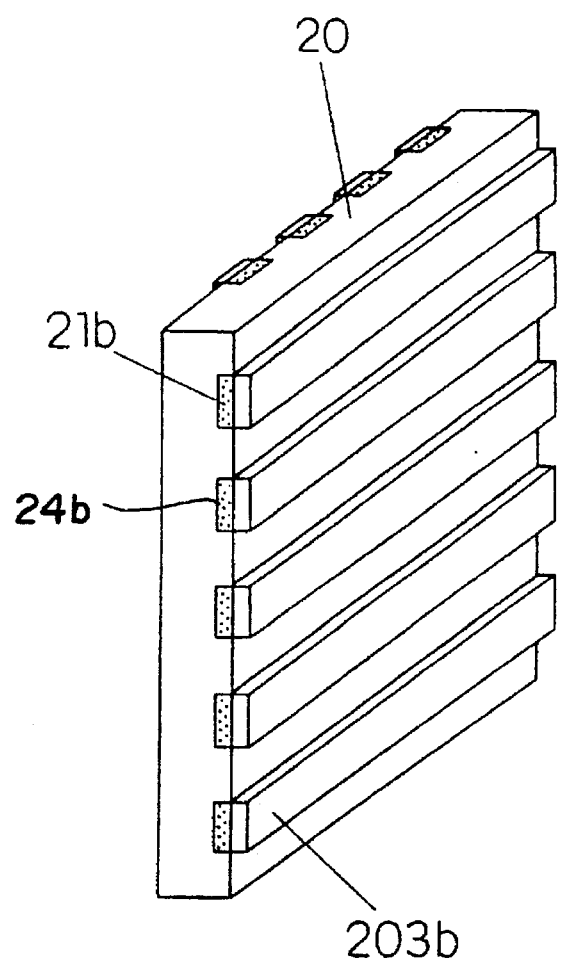

This embodiment is to realize a device having the same function as in Embodiments 7 and 8 by a different constitution. FIG. 13(a) and 13(b) are a perspective views of the polarization anisotropic hologram of the embodiment, showing a view from the surface side in 13(a) and from the back side in 13(b). Reference numeral 20 is a lithium niobate substrate of an x-plane, 21a is a proton exchange region formed periodically on the surface of the lithium niobate substrate 20, and 203a is a dielectric film formed in the same pattern as the proton exchange region 21a. On the back side of the lithium niobate substrate 20, similarly, a periodic proton exchange region 21b and a dielectric film 203b are formed.

The back side of this device operates same the as the device in Embodiment 7. The surface side diffracts only ordinary light the same as the surface side in Embodiment 7, but its principle of operation is different. In this device, in order not to diffract the extraordinary light, $\Delta\phi e$ expressed in formula (10) is set at an integer multiple of ($2\pi$) (for example, $2\pi$), and $\Delta\phi o$ is determined so as to obtain a desired diffraction efficiency of ordinary light by defining the depth of the proton exchange region 21b and groove 24b.

In this way, the device having the same function as in Embodiment 7 and Embodiment 8 can be realized in a different constitution.

(Embodiment 10)

Figure 14:
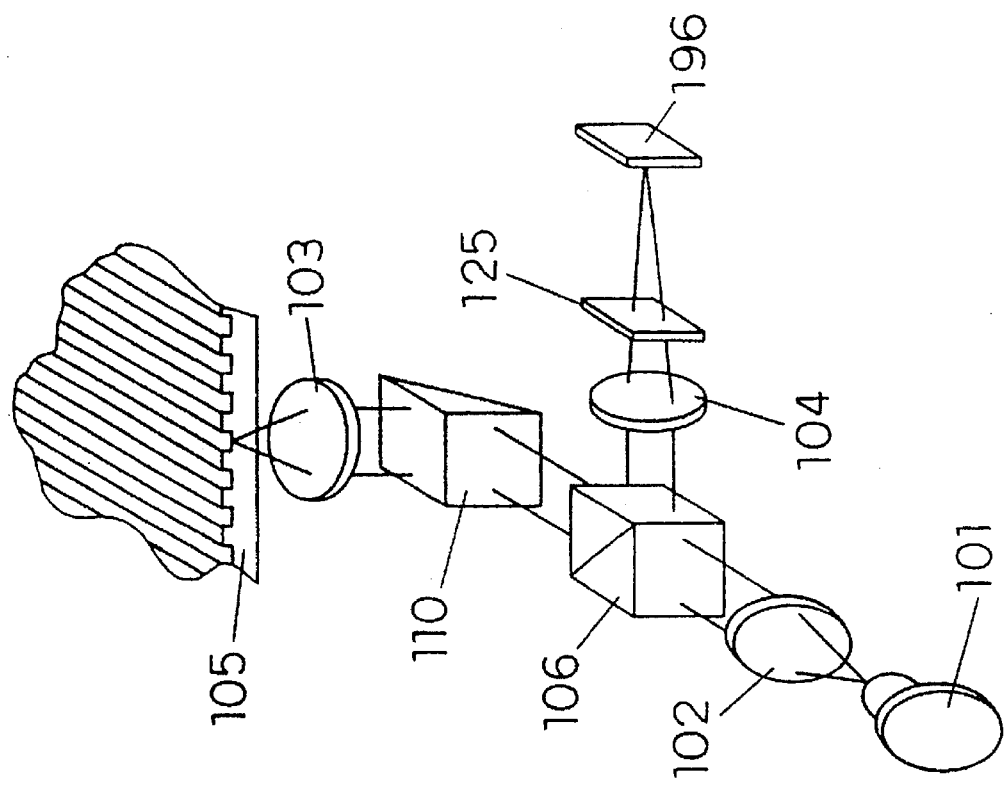
FIG. 14 is a structural diagram of the optical head apparatus of Embodiment 10.

This embodiment relates to an optical head apparatus using the optical device in Embodiments 7 to 9. FIG. 14 is a structural diagram of the optical head apparatus of the tenth embodiment. Referring to this diagram, the optical head apparatus of the tenth embodiment is described below.

The light emitted from the semiconductor laser 101 is transformed into parallel light by the collimating lens 102, and is condensed on the optical disk 105 by the objective lens 103 through the beam splitter 106 and the total reflection prism 110. The reflected light from the optical disk 105 is transformed again into parallel light by the objective lens 103, and is put into the beam splitter 106 through the total reflection prism 110, and is reflected by the beam splitter 106. The light reflected by the beam splitter 106 is transformed into focusing light by the detector lens 104, and is put into the polarizing hologram 125 composed of the optical device in any one of Embodiments 7 to 9. The polarizing and separating hologram 125 is installed so that its z-axis may have an inclination of 45 degrees to the principal direction of polarization of the incident light.

The light entering the polarizing and separating hologram 125 is separated into a polarized light component in the z-axis direction and a polarized light component vertical to the z-axis, which are totally diffracted on different planes and put into the photo detector 196, and a recording and reproducing signal and a servo signal are obtained.

The polarizing and separating hologram 125 and photo detector 196 are in the shape shown in FIG. 2 to FIG. 4, and the patterns of the polarizing and separating hologram 121 and polarizing and separating hologram 122 are formed on the surface side and back side of the polarizing and separating hologram 125, so that the operation is the same as explained in Embodiments 1 to 3. Besides, by installing the diffraction lattice 111 in the optical path of the semiconductor laser 101 and beam splitter 106, the constitution in FIG. 5 as explained in Embodiment 4 is also possible.

(Embodiment 11)

Figure 15:
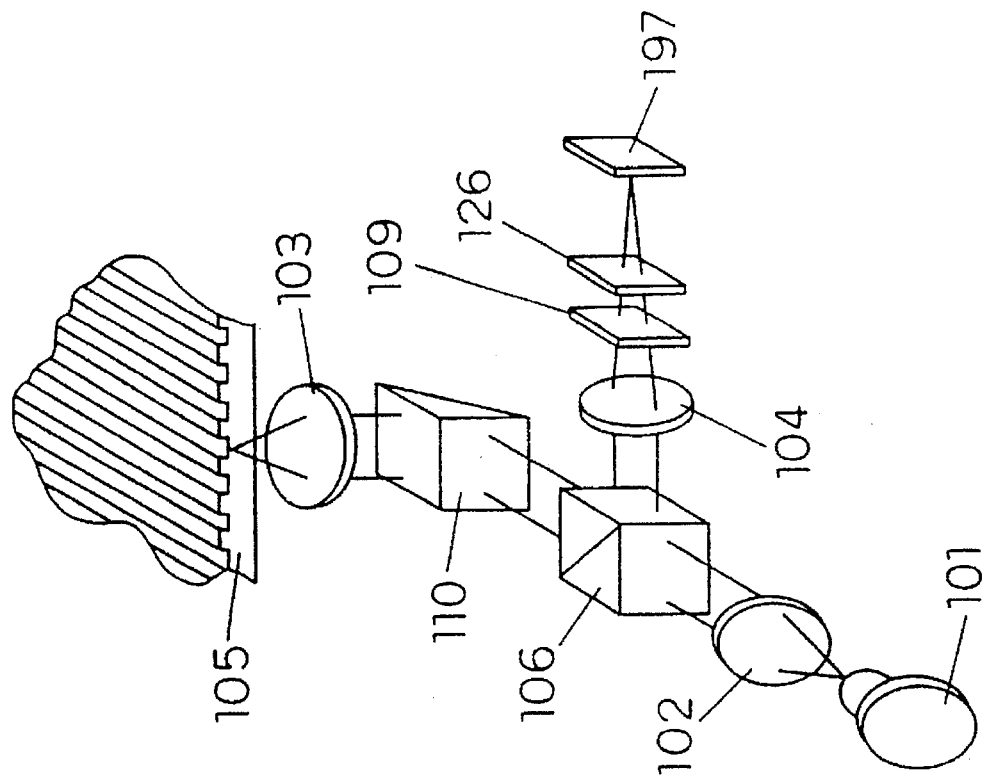
FIG. 15 is a structural diagram of the optical head apparatus of Embodiment 11.
Figure 16:
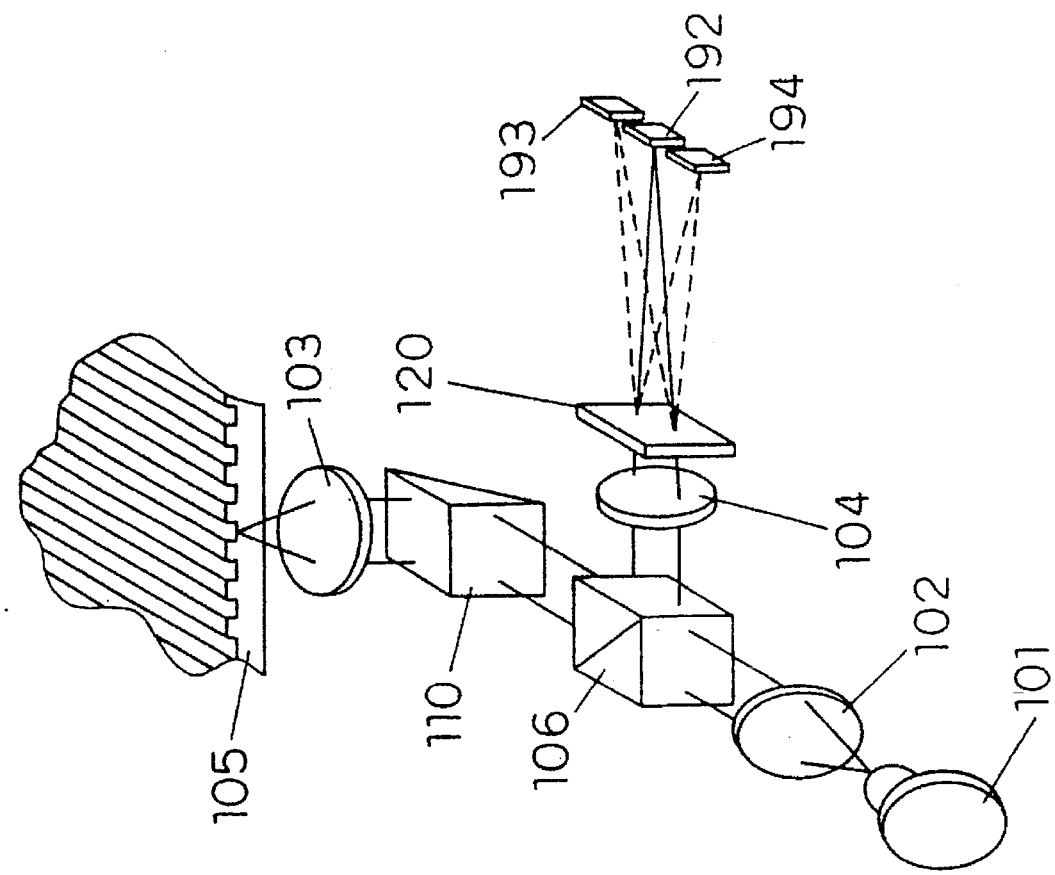
FIG. 16 is a structural diagram of a conventional optical head apparatus.
Figure 17:
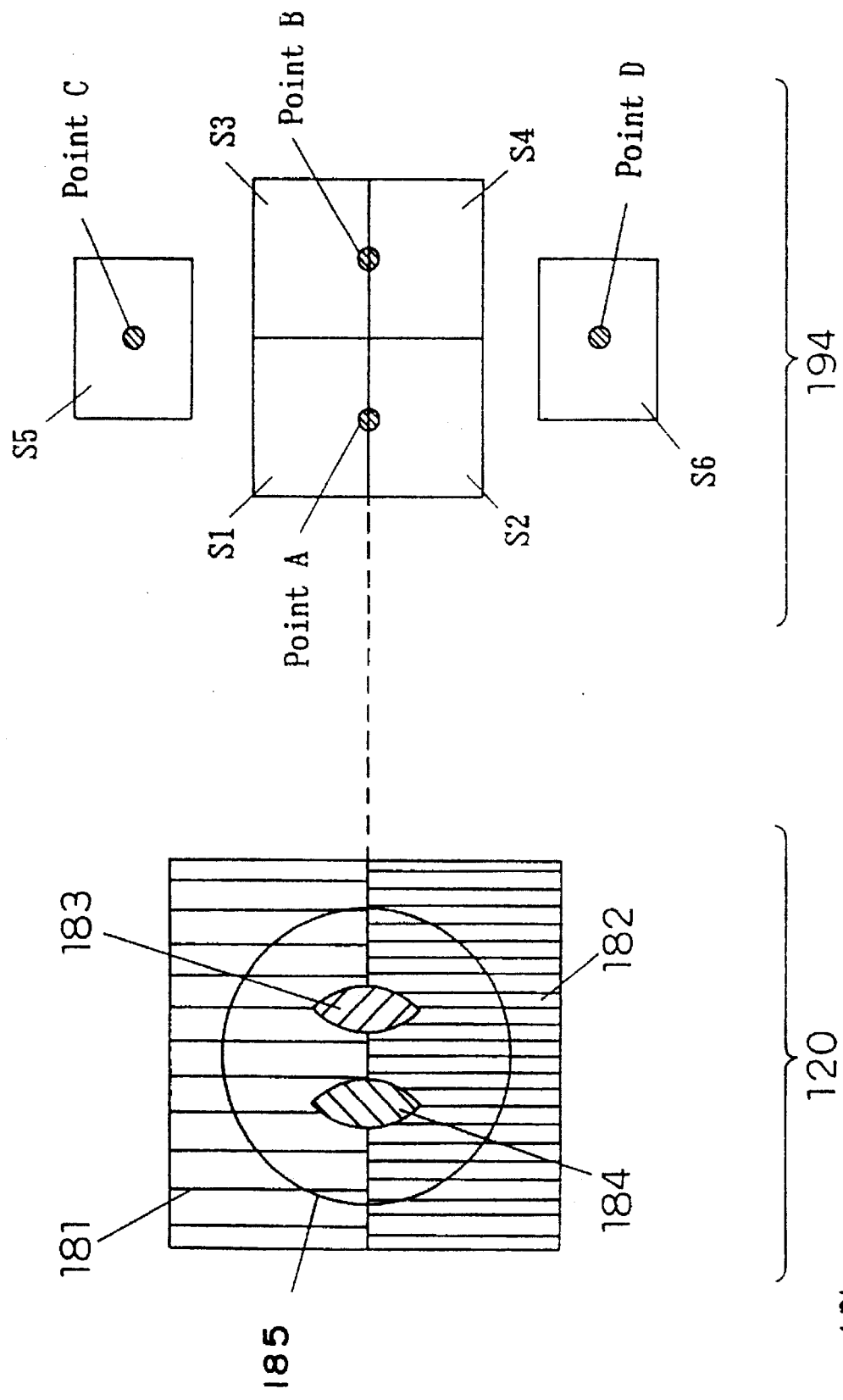
FIG. 17 is a diagram showing the configuration of the lattice pattern of a polarizing and separating hologram and the segment division pattern of a photo detector in the conventional optical head apparatus.

This embodiment relates to an optical head apparatus using the optical device in Embodiments 7 to 9. FIG. 15 is a structural diagram of the optical head apparatus of Embodiment 11. The optical head apparatus of Embodiment 11 is described below by referring to the diagram.

The light emitted from the semiconductor laser 101 is transformed into parallel light by the collimating lens 102, and is condensed on the optical disk 105 by the objective lens 103 through the beam splitter 106 and the total reflection prism 110. The reflected light from the optical disk 105 is transformed again into parallel light by the objective lens 103, and is put into the beam splitter 106 through the total reflection prism 110, and is reflected by the beam splitter 106. The light reflected by the beam splitter 106 is transformed into focusing light by the detector lens 104. This light passes through the cylindrical lens 109, and is provided with astigmatism, and enters the polarizing hologram 126 composed of the optical device in any one of Embodiments 7 to 9. The polarizing and separating hologram 126 is installed so that its z-axis may have an inclination of 45 degrees to the principal direction of polarization of the incident light.

The light entering the polarizing and separating hologram 126 is separated into a polarized light component in the z-axis direction and a polarized light component vertical to the z-axis, which are partly diffracted on different planes and put into the photo detector 196, and a recording and reproducing signal and a servo signal are obtained.

The polarizing and separating hologram 126 and photo detector 196 are in the shape shown in FIG. 7, and the patterns of the polarizing and separating hologram 123 and polarizing and separating hologram 124 are formed on the surface side and back side of the polarizing and separating hologram 126, so that the operation is the same as explained in Embodiment 5. Besides, by installing the diffraction lattice 111 in the optical path of the semiconductor laser 101 and beam splitter 106, the constitution in FIG. 8 as explained in Embodiment 6 is also possible.

As described herein, the invention realizes an optical head of high performance, being small in the number of head amplifiers for detection of optomagnetic signal and free from imbalance, and its practical effects are outstanding.

What is claimed is:

1. An optical head apparatus comprising:

a light source, an optical system for receiving a light beam of linear polarization from the light source and converging the light beam onto an information medium, an optical system for giving astigmatism to light reflected by the information medium, a first diffraction element for diffracting at least a portion of the astigmatized light polarized in a first direction, and a second diffraction element for diffracting at least a portion of the astigmatized light polarized in a second direction orthogonal to the first direction, and a detector for detecting light transmitted through the first and second diffraction elements based upon the astigmatism, the detector being divided into a plurality of detecting regions.

2. An optical head apparatus comprising:

a light source, an optical system for receiving a light beam of linear polarization from the light source and converging the light beam onto an information medium, an optical system for giving astigmatism to light reflected by the information medium, a first diffraction element for diffracting at least a portion of the astigmatized light polarized in a first direction, and a second diffraction element for diffracting at least a portion of the astigmatized light polarized in a second direction orthogonal to the first direction, a first detector for detecting light transmitted through the first and second diffraction elements by using the astigmatism, the first detector being divided into a plurality of detecting regions, a second detector for detecting light transmitted through the first diffraction element, and a third detector for detecting light transmitted through the second diffraction element, wherein a servo signal is obtained based upon light detected by said plurality of said detecting regions, and an optomagnetic signal is obtained based upon a difference between light detected by the second detector and light detected by the third detector.

3. The optical head apparatus of claim 2, wherein the optomagnetic signal is obtained based only upon light diffracted by either the first diffraction element or the second diffraction element.

4. A diffraction device comprising:

a birefringent crystal having a first side and a second side, the first side of the crystal defining a plurality of first grooves, A plurality of first proton exchange regions on the first side, a surface of each of the first proton exchange regions forming a bottom of one of the first grooves, the first proton exchange regions being arranged on the first side to diffract at least a portion of light passing through the first side polarized in a first direction, and a plurality of second proton exchange regions on the second side, the second proton exchange region being arranged on the second side to diffract at least a portion of light passing through the second side polarized in a second direction orthogonal to the first direction.

5. The diffraction device of claim 4, wherein the second side of the crystal defines a plurality of second grooves, a surface of each of the second proton exchange regions forming a bottom of one of the second grooves.

6. The diffraction device of claim 4, further including a dielectric film formed over each of the second proton exchange regions.

7. An optical device comprising:

a birefringent crystal having a first side and a second side, a plurality of first proton exchange regions on the first side of the crystal, surfaces of the first proton exchange regions being concave to a surface of the crystal on the first side, a plurality of second proton exchange regions on the second side of the crystal, and a plurality of dielectric films formed only on the second proton exchange regions.

8. An optical head apparatus comprising:

a light source;

an optical system for converging a light beam from the light source onto an information medium;

a diffraction element for diffracting light reflected from the information medium, the diffraction element including a birefringent crystal having a first side and a second side, the first side of the crystal defining a plurality of first grooves, a plurality of first proton exchange regions on the first side, a surface of each of the first proton exchange regions being forming a bottom of one of the first grooves, the first proton exchange regions being arranged on the first side to diffract at least a portion of light passing through the first side polarized in a first direction, and a plurality of second proton exchange regions on the second side, the second proton exchange regions being arranged on the second side to diffract at least a portion of light passing through the second side polarized in a second direction orthogonal to the first direction; and a detector for detecting light transmitted through the diffraction element.

9. The optical head apparatus of claim 8, wherein the second side of the crystal defines a plurality of second grooves, a surface of each of the second proton exchange regions forming a bottom of one of the second grooves.

10. The optical head apparatus of claim 8, further including a dielectric film formed over each of the second proton exchange regions.

11. The optical head apparatus of claim 8, further including an optical system for giving astigmatism to light reflected by the information medium before the reflected light is transmitted to the diffraction element.

* * * * *